(12) United States Patent
Wolf

(10) Patent No.: US 11,767,579 B2
(45) Date of Patent: Sep. 26, 2023

(54) NICKEL BASED ALLOY FOR POWDER AND METHOD FOR PRODUCING A POWDER

(71) Applicant: VDM Metals International GmbH, Werdohl (DE)

(72) Inventor: Martin Wolf, Dortmund (DE)

(73) Assignee: VDM Metals International GmbH, Werdohl (DE)

( * ) Notice: Subject to any disclaimer, the term of this patent is extended or adjusted under 35 U.S.C. 154(b) by 112 days.

(21) Appl. No.: 17/604,848

(22) PCT Filed: Jul. 1, 2020

(86) PCT No.: PCT/DE2020/100576
§ 371 (c)(1),
(2) Date: Oct. 19, 2021

(87) PCT Pub. No.: WO2021/004580
PCT Pub. Date: Jan. 14, 2021

(65) Prior Publication Data
US 2022/0195560 A1    Jun. 23, 2022

(30) Foreign Application Priority Data

Jul. 5, 2019 (DE) .................... 10 2019 118 221.2
Jun. 26, 2020 (DE) .................... 10 2020 116 865.9

(51) Int. Cl.
| | |
|---|---|
| *B22F 9/08* | (2006.01) |
| *C22C 19/05* | (2006.01) |
| *B22F 1/065* | (2022.01) |
| *B22F 1/00* | (2022.01) |
| *B33Y 70/00* | (2020.01) |

(52) U.S. Cl.
CPC ............ *C22C 19/05* (2013.01); *B22F 1/00* (2013.01); *B22F 1/065* (2022.01); *B22F 9/082* (2013.01); *C22C 19/055* (2013.01); *B33Y 70/00* (2014.12)

(58) Field of Classification Search
CPC ..... C22C 19/055; C22C 1/0433; C22C 19/05; B22F 9/082; B22F 1/065; B22F 1/00
See application file for complete search history.

(56) References Cited

U.S. PATENT DOCUMENTS

| | | |
|---|---|---|
| 3,591,362 A | 7/1971 | Benjamin |
| 3,802,938 A | 4/1974 | Collins et al. |
| 6,416,564 B1 | 7/2002 | Bond et al. |
| 7,484,926 B2 | 2/2009 | Suga et al. |
| 7,946,813 B2 | 5/2011 | Fukuda et al. |
| 9,238,854 B2 | 1/2016 | Kwon et al. |
| 11,306,380 B2 | 4/2022 | Gehrmann et al. |
| 2009/0123690 A1 | 5/2009 | Scholl et al. |
| 2009/0277301 A1 | 11/2009 | Scholl et al. |
| 2013/0011295 A1 | 1/2013 | Kloewer et al. |
| 2015/0344994 A1 | 12/2015 | Etter et al. |
| 2019/0048451 A1 | 2/2019 | Ota et al. |
| 2019/0055627 A1 | 2/2019 | Nagatomi et al. |
| 2019/0284666 A1 | 9/2019 | Okada et al. |
| 2020/0206816 A1 | 7/2020 | Daigo et al. |

FOREIGN PATENT DOCUMENTS

| | | | |
|---|---|---|---|
| CN | 1854464 A | 11/2006 | |
| CN | 101158289 A | 4/2008 | |
| CN | 108115136 A | 6/2018 | |
| CN | 108941588 A | 12/2018 | |
| DE | 1909781 A1 | 2/1970 | |
| DE | 10 2010 011 609 A1 | 9/2011 | |
| DE | 10 2013 018 006 A1 | 6/2014 | |
| DE | 10 2015 008 322 A1 | 1/2017 | |
| DE | 10 2015 0106 729 A | 6/2017 | |
| EP | 1 377 690 B1 | 1/2008 | |
| EP | 3 120 953 A1 | 1/2017 | |
| GB | 1 324 621 A | 7/1973 | |
| GB | 2 311 997 A | 10/1997 | |
| JP | 2004-527377 A | 9/2004 | |
| JP | 2013-522465 A | 6/2013 | |
| JP | 2015-224394 A | 12/2015 | |
| JP | 2019-035144 A | 3/2019 | |
| WO | 2006/072586 A2 | 7/2006 | |
| WO | 2008/006801 A1 | 1/2008 | |
| WO | 2015/110668 A2 | 7/2015 | |
| WO | 2017/026519 A1 | 2/2017 | |
| WO | WO-2018066579 A1 * | 4/2018 | ............ C22C 19/05 |
| WO | 2019/049594 A1 | 3/2019 | |
| WO | 2019/110050 A1 | 6/2019 | |

OTHER PUBLICATIONS

English translation of the International Preliminary Report on Patentability and Written Opinion of the International Searching Authority in PCT/DE2020/100574, dated Jan. 20, 2022.
English translation of the International Preliminary Report on Patentability and Written Opinion of the International Searching Authority in PCT/DE2020/100576, dated Jan. 20, 2022.
Japanese Office Action dated Sep. 2, 2022 in Japanese Application No. 2021-568159 with English translation.
International Search Report in PCT/DE2020/100576, dated Oct. 19, 2020.
International Search Report in PCT/DE2020/100574, dated Oct. 1, 2020.
Quanyan Wu et al.: Microstructure of Long-Term Aged IN617 Ni-Base Superalloy, Metallurgical and Materials Transactions A, Springer-Verlag, New York, Bd. 39, Nr. 11, pp. 2569-2585.

* cited by examiner

*Primary Examiner* — Jessee R Roe
(74) *Attorney, Agent, or Firm* — Collard & Roe, P.C.

(57) ABSTRACT

A nickel-based alloy for powder has the contents (in wt. %): C 0.01-0.5%, S max. 0.5%, in particular max. 0.03%, Cr 20-25%, Ni radical Mn max. 1%, Si max. 1%, Mo up to 10%, Ti 0.25-0.6%, Nb up to 5.5%, Cu up to 5%, in particular up to 0.5%, Fe up to 25%, P max. 0.03%, in particular max. 0.02%, Al 0.8-1.5%, V max. 0.6%, Zr max. 0.12%, in particular max. 0.1%, Co up to 15%, B 0.001-0.125% O >0.00001-0.1% and impurities dependent on production. The carbon to boron ratio (C/B) is between 4 and 25.

8 Claims, No Drawings

NICKEL BASED ALLOY FOR POWDER AND METHOD FOR PRODUCING A POWDER

CROSS REFERENCE TO RELATED APPLICATIONS

This application is the National Stage of PCT/DE2020/100576 filed on Jul. 1, 2020, which claims priority under 35 U.S.C. § 119 of German Application Nos. 10 2019 118 221.2 filed on Jul. 5, 2019 and 10 2020 116 865.9 filed on Jun. 26, 2020, the disclosures of which are incorporated by reference. The international application under PCT article 21(2) was not published in English.

BACKGROUND OF THE INVENTION

1. Field of the Invention

The invention relates to a nickel base alloy for powder.

2. Description of the Related Art

WO 2015/110668 A2 discloses a method for the manufacture of iron-base powders, which are atomized by means of a centrifuge, with the following method steps:
providing an alloy having a melting point above 1040° C.,
melting the composition,
atomizing the molten composition by means of a centrifuge or a rotating atomization device.

DE 10 2015 016 729 A discloses a method for the manufacture of metallic semi-finished products from an alloy having more than 50% nickel, containing the following process steps:
an electrode is generated by VIM,
for reduction of stresses and for overaging, the electrode is subjected in a furnace to a heat treatment in the temperature range between 400 and 1250° C. for a period of 10 to 336 hours,
in a manner depending on dimensions, especially depending on diameter, the electrode is cooled in air or in the furnace to a temperature between room temperature and lower than 1250° C., especially lower than 900° C.,
the cooled electrode is then remelted by VAR at a remelting rate of 3.0 to 10 kg/minute to obtain a VAR ingot,
the VAR ingot is heat-treated in a furnace in the temperature range between 400 and 1250° C. for a period of 10 to 336 hours,
in a manner depending on dimensions, especially depending on diameter, the VAR ingot is cooled in air or in the furnace to a temperature between room temperature and lower than 1250° C., especially lower than 900° C.,
the VAR ingot is remelted once again at a remelting rate of 3.0 to 10 kg/minute,
the remelted VAR ingot is subjected to a heat treatment in the temperature range between 400 and 1250° C. for a period of 10 to 336 hours,
the VAR ingot is then brought by hot and/or cold working to the desired product shape and dimension.

Due to U.S. Pat. No. 3,802,938, a method had become known for the manufacture of a nickel-base alloy that may have the following composition: Cr 5.0-25%, Co 5.0-25%, Mo up to 12%, W up to 15%, Nb up to 4%, Ti 0.5-6 &, Al 1-7%, B up to 0.4%, Zr up to 0.3%, Ta up to 12%, Hf up to 5%, Re up to 1%. The alloy may consist of powder, which is shaped by pressing and subjected to a heat treatment, wherein one powder component consists of a largely carbon-free nickel-base superalloy and another component of a powdered carbide.

It is generally known that Ni and Ni—Co alloys are used in order to fabricate structural parts having special properties in terms of corrosion resistance and good mechanical properties, such as strength, high-temperature strength and fracture toughness.

SUMMARY OF THE INVENTION

The task underlying the invention is to provide, for the additive fabrication of components, a powder that has the advantageous properties of the Ni and Ni—Co alloys and can be manufactured inexpensively. In this regard, it is important to meet the special requirements applicable to distribution of the particle size, particle shape and pourability of the powder.

In addition, it is intended to propose a method for the manufacture of such a powder.

This task is accomplished by a nickel-base alloy for powder, wherein the contents (in wt %) are defined as follows:
C 0.15-0.5%
S max. 0.15%, especially max. 0.03%
Cr 20-25%
Ni the rest
Mn max. 1%
Si max. 1%
Mo 8-10%
Ti 0.25-0.6%
Nb up to 5.5%
Cu up to 5%, especially up to 0.5%
Fe up to 25%
P max. 0.03%, especially max. 0.02%
Al 0.8-1.5%
max. 0.6%
Zr max. 0.12%, especially max. 0.1%
Co 10-15%
B 0.0060-0.125%
O >0.00001-0.1%
and manufacturing-related impurities, wherein the ratio of carbon to boron (C/B) lies between 4 and 25.

Advantageous further developments of the powder alloy according to the invention can be inferred from the associated dependent claims.

This task is also accomplished by a method for the manufacture of a powder from a nickel-base alloy in which
an alloy is melted in a VIM furnace,
the molten melt is maintained for 5 minutes to 2 hours for homogenization,
a closed atomization system having a supplied gas is adjusted to a dew point of −10° C. to −120° C.,
the melt is blown by a nozzle in a gas stream with a gas flow rate of 2 qm$^3$/min to 150 qm$^3$/min,
the solidified powder particles are collected in a gas-tight closed container, wherein
the particles have a particle size of 5 μm to 250 μm, the particles of the powder are spherical,
the powder has gas inclusions of 0.0 to 4% pore area (pores >1 μm) in relationship to the total area of evaluated objects,
the powder has a bulk density of 2 up to the density of the alloy, which is approximately 8 g/cm$^3$,
the powder is packed air-tightly under the protective-gas atmosphere with argon.

Advantageous further developments of the method according to the invention can be inferred from the associated dependent claims according to the method.

DETAILED DESCRIPTION OF PREFERRED EMBODIMENTS

The following initial fabrication steps are conceivable:
a master alloy ingot having defined chemical analysis is generated by melting in the VIM furnace,
cutting a master alloy ingot into small pieces by sawing, melting the pieces of the master alloy in a VIM furnace, or
melting alloying elements of a defined weight corresponding to the chemical analysis in a VIM furnace,
maintaining the molten melt for 5 minutes to 2 hours for homogenization.

After the alternative initial fabrication steps, the following further processing steps may take place:
the closed atomization system is adjusted with argon gas to a dew point of −10° C. to −120° C., preferably in the range of −30° C. to −100° C.,
the melt is blown by a nozzle in an argon stream with a gas flow rate of 2 qm³/min to 150 qm³/min,
the solidified powder particles are collected in a gas-tight closed container,
the particles have a particle size of 5 µm to 250 µm, wherein preferred ranges lie between 5 and 150 µm, or 10 and 150 µm,
the particles of the powder are spherical,
the powder has gas inclusions of 0.0 to 4% pore area (pores >1 µm) in relationship to the total area of evaluated objects, wherein preferred ranges are from 0.0 to 2%. The quantity of the gas inclusions of the powder permits a low residual porosity of the manufactured parts.
the powder has a bulk density of 2 up to the density of the alloy, which is approximately 8 g/cm³, wherein preferred ranges have values from 4 to 5 g/cm³,
the powder is packed air-tightly under a protective-gas atmosphere with argon.

The powder according to the invention is preferably produced in a vacuum inert gas atomization system (VIGA). In this system, the alloy is melted in a vacuum induction melting furnace (VIM), directed into a casting gate that leads to a gas nozzle, in which the molten metal is atomized to metal particles with inert gas under high pressure of 5 to 100 bar. The melt is heated in the melting crucible to 5 to 400° C. above the melting point. The metal flow rate during atomization amounts to 0.5 to 80 kg/min and the gas flow rate is 2 to 150 m³/min. Due to the rapid cooling, the metal particles solidify in the form of balls (spherical particles). The inert gas used for the atomization may contain 0.01 to 100% nitrogen if necessary. The gas phase is then separated from the powder in a cyclone, and then the powder is packaged.

Alternatively, the powder according to the invention may be manufactured via the so-called EIGA method instead of via VIGA. For this purpose, a prefabricated alloy ingot in the form of a rotating electrode is melted contactlessly in an induction coil. The melt drips from the electrode directly into the gas stream of a gas nozzle.

The alloy ingot for EIGA may in turn be manufactured by the VIM, ESR, VAR, VOD or VLF melting method and combinations thereof and optionally subjected to hot-forming processes such as forging and rolling. A cleaning of the surface of the ingot by a treatment such as grinding or/and scalping prior to the use in the EIGA method is of advantage.

The inert gas for the powder manufacture may optionally be argon or a mixture of argon with 0.01 to 100% nitrogen. Possible limits of the nitrogen content may be:
0.01 to 80%
0.01 to 50%
0.01 to 30%
0.01 to 20%
0.01 to 10%
0.01 to 10%
0.1 to 5%
0.5 to 10%
1 to 5%
2 to 3%

Alternatively, the inert gas may optionally be helium.

The inert gas may preferably have a purity of at least 99.996 vol %. In particular, the nitrogen content should be from 0.0 to 10 ppmv, the oxygen content from 0.0 to 4 ppmv and have an H2O content of 5 ppmv.

In particular, the inert gas may preferably have a purity of at least 99.999 vol %. In particular, the nitrogen content should be from 0.0 to 5 ppmv, the oxygen content from 0.0 to 2 ppmv and have an H2O content of 3 ppmv.

The dew point in the system lies in the range of −10 to −120° C. It preferably lies in the range of −30 to −100° C.

The pressure during powder atomization may preferably be 10 to 80 bar.

The structural parts and components or layers on structural parts and components manufactured by means of additive fabrication are built up from layer thicknesses of 5 to 500 µm and directly after manufacture have a textured microstructure with grains elongated in structure direction and having a mean grain size of 2 µm to 1000 µm. The preferred range lies between 5 µm and 500 µm.

The structural parts and components or layers on structural parts and components manufactured by means of additive fabrication may optionally be subjected to a solution annealing in the temperature range of 700° C. to 1250° C. for 0.1 minutes to 70 hours, if necessary under shield gas, such as argon or hydrogen, for example, followed by a cooling in air, in the agitated annealing atmosphere or in the water bath. Thereafter the surface may optionally be cleaned or machined by pickling, blasting, grinding, turning, peeling, milling. Optionally, such a machining may already take place partly or completely even before the annealing.

The structural parts and components or layers on structural parts and components manufactured by means of additive fabrication have after an annealing a mean grain size of 2 µm to 2000 µm. The preferred range lies between 20 µm and 500 µm.

The structural parts and components or layers on structural parts and components manufactured from the powder generated according to the invention by means of additive fabrication are intended to be used preferably in areas in which the material is also used as wrought or cast alloy with related analysis.

Under additive fabrication, terms such as generative fabrication, rapid technology, rapid tooling, rapid prototyping or the like are also understood.

Moreover, the powder described above may also be used for the manufacture of the structural parts by means of hot isostatic pressing (HIP) or conventional sintering and extrusion-pressing processes. Moreover, the method combination of additive fabrication and subsequent HIP treatment is possible. For this purpose it is possible to apply the post processing steps described below for HIP structural parts for the generative fabrication.

In general, the following are distinguished here:
3D printing with powders,
Selective laser sintering and
Selective laser melting
Laser deposit welding
Selective electron beam welding.

The abbreviations used here are defined as follows:
VIM Vacuum Induction Melting
VIGA Vacuum Inert Gas Atomization system
VAR Vacuum Arc Remelting
VOD Vacuum Oxygen Decarburization
VLF Vacuum Ladle Furnace
EIGA Electrode Induction Melting Gas Atomization Advantageous further developments of the method according to the invention can be inferred from the dependent claims.

The range of values for the particle size of the powder lies between 5 and 250 μm, wherein preferred ranges lie between 5 and 150 μm or 10 and 150 μm.

The powder has gas inclusions of 0.0 to 4% pore area (pores >1 μm) in relation to the total area of evaluated objects, wherein preferred ranges are
0.0 to 2%
0.0 to 0.5%
0.0 to 0.2%
0.0 to 0.1%
0.0 to 0.05%

The powder has a bulk density of 2 up to the density of the alloy, which is approximately 8 g/cm$^3$, wherein preferred ranges may have the following values.
4-5 g/cm$^3$
2-8 g/cm$^3$
2-7 g/cm$^3$
3-6 g/cm$^3$ The quantity of the gas inclusions of the powder permits a low residual porosity of the manufactured parts.

The powders fabricated according to this method and also components fabricated from this powder (3D printed samples) are free of nitrides and also of carbides and/or carbonitrides. Should nitrides and also carbides nevertheless be present, these have a particle size in the diameter of <100 nm especially <50 nm.

After a heat treatment of components fabricated from this powder (3D printed samples) for homogenization, diffusion annealing above 900° C., especially above 1000° C., ideally above 1100° C. for more than 1 hour, nitrides and also carbides and/or carbonitrides may appear in the fabricated components (3D printed samples). These have a particle size in the diameter of <8 μm, or respectively <5 μm, ideally <1 μm.

Compared with the prior art, the centrifugation method is omitted, and hereby the operating time of the system is optimized. The subsequent refining processes optimize the quality of the powder for the additive fabrication.

It may be of advantage if the ingot is subjected, prior to the dissection, to a machining of the surface (e.g. by brushing, grinding, pickling, cutting, scalping, etc.). In the process, defects may be removed that cannot be eliminated by the further remelting and that may cause impairment for subsequent applications.

The method according to the invention can be applied to any Ni-base or Ni—Co-base alloy.

In the following, an alloy composition is presented that may be produced as powder by means of the method parameters according to the invention. This carbon-containing alloy composition may be processed as powder with a particle size of preferably between 15 μm and 53 μm or between 45 μm and up to 150 μm by means of a fusion-welding process such as laser or electron beam to obtain structural parts. The alloy composition is characterized by a particularly good processability in the form of a particularly low hot-cracking tendency when the ratio of carbon to boron (C/B ratio) in the powder lies between >4 and <25 and the sum of B+C is >0.1875% and <0.525%.

The structural parts made from this alloy composition by means of welding process are preferably used in the area of high-temperature application (service temperature >550° C.) with simultaneous mechanical stress (creep stress for >10,000 hours).

An advantageous composition of the powder according to the invention is reproduced in the following (all values are in wt %):
C 0.15-0.50%
S max. 0.150%, especially max. 0.03%
Cr 22-25%
Ni the rest
Mn max 1%
Si max. 1%
Mo 8-10%
Ti 0.25-0.5%
Nb max. 5.5%
Cu max. 5%, especially max. 0.5%
Fe max. 25%
Al 0.80-1.50%
V max. 0.6%
Zr max. 0.12%, especially max. 0.1%
Co 11-13%
0.00001-0.1%
B 0.0060-0.125%
and manufacturing-related impurities,
wherein the ratio of carbon to boron (C/B) lies between 4 and 25 and the sum of B+C is >0.1875% and <0.525%.

The optimum ratio of carbon to boron lies between 4 and 25 and the sum of B+C lies between >0.1875% and <0.525%. This is justified as follows: in melting, casting and welding processes, the solidification interval, or in other words the temperature range between the liquidus temperature and the solidus temperature, is decisive for the formation of solidification-related flaws, such as hot cracks or internal shrinkage cavities, for example. The addition of the element boron broadens the solidification interval. Thus it has been found that an increase of the boron content from 0.005% to 0.020% broadens the solidification interval from 127 K to 141 K. In contrast, with increased addition of the element carbon, this becomes associated with the element boron and effectively narrows the solidification interval. Thus an increase of the carbon content from 0.055% to 0.500% at a boron content of 0.005% leads to a decrease of the solidification interval from 127 K to 99 K. At a boron content of 0.020%, a carbon content of 0.350% leads to a solidification interval of 123 K, but at a carbon content of 0.500%, it leads only to a solidification interval of 113 K (see Table 1).

TABLE 1

| Alloy | B | C | incipient | liquids | dT | C/B | C + B |
| --- | --- | --- | --- | --- | --- | --- | --- |
| FM 617B | 0.0023 | 0.056 | 1255 | 1372 | 117 | 24 | 0.058 |
| FM 617 | 0.0050 | 0.055 | 1245 | 1372 | 127 | 11 | 0.060 |

TABLE 1-continued

| Alloy | B | C | incipient | liquids | dT | C/B | C + B |
|---|---|---|---|---|---|---|---|
| Var 1 | 0.0200 | 0.350 | 1236 | 1359 | 123 | 17.5 | 0.37 |
| Var 2 | 0.0200 | 0.500 | 1240 | 1353 | 113 | 25 | 0.52 |
| Var 3 | 0.0250 | 0.500 | 1240 | 1353 | 113 | 20 | 0.525 |
| Var 4*) | 0.0050 | 0.500 | 1255 | 1354 | 99 | 100 | 0.505 |
| Var 5*) | 0.0200 | 0.055 | 1230 | 1371 | 141 | 2.75 | 0.075 |

*)Control variants with B <0.0060% and C/B <4 or >25

From this it follows that an increase of the boron content does not lead to an unacceptable deterioration of the processing properties via the molten phase, such as in the welding or the selective laser melting, for example, if the carbon content is simultaneously increased. The ideal ratio between C and B has been determined as 14.8. This means that the solidification interval remains constant even for an addition of boron, if carbon if the ratio relative to boron is increased to the factor 14.8.

The increase of boron with simultaneously increased carbon content additionally leads to a predominant occurrence of M23C6 primary carbides with simultaneously reduced occurrence of M6C carbides. The advantage of M23C6 carbides compared with the M6C carbides is that these are not redissolved in an annealing treatment, such as a solution annealing, for example, and remain stably distributed in the microstructure and thus also in the grain and not mainly at the energetically favored grain boundaries.

Beyond this, it has been found that the formation of the sigma phase is reduced or can even be completely suppressed by a higher carbon content.

Beyond this, the following elements may be present (values in wt %):

| | |
|---|---|
| Nb + Ta max. | 5.2% |
| Se max. | 0.0005% |
| Bi max. | 0.00005% |
| Pb max. | 0.002% |
| P max. | 0.01% |

Optionally, the oxygen content of the generated alloy may lie at 0.00001-0.1%, at 0.0001-0.1%, at 0.001-0.1%, at 0.001-0.0020 or at 0.0015-0.002%.

Alternatively, the oxygen content may also be adjusted as follows:

| |
|---|
| 0.00001-0.1 |
| 0.00002-0.1 |
| 0.00005-0.1 |
| 0.00008-0.1 |
| 0.0001-0.1 |
| 0.0002-0.1 |
| 0.0005-0.1 |
| 0.0008-0.1 |
| 0.001-0.1 |
| 0.002-0.1 |
| 0.005-0.1 |
| 0.008-0.1 |
| 0.010-0.1 |
| 0.00001-0.10 |
| 0.00001-0.08 |
| 0.00001-0.05 |
| 0.00001-0.03 |
| 0.00001-0.02 |

If necessary—depending on the application situation—the following elements may be adjusted within the ranges of values below:

| | |
|---|---|
| Co | >11-<15% |
| Mn | >0.001-<0.3% |
| Mo | >8.4-<10% |
| Ti | >0.25-<0.35% |

An advantageous ratio:
C/B lies between >12 and <18.

It is further advantageous when the sum of C+B lies between 0.156 and 0.625%, in particular in the range of 0.16 and 0.6%, especially in the range of 0.1875 and 0.530%.

Preferred areas of application of the powder according to the invention are indicated in the following:
additive fabrication of components or structural parts
additive fabrication of layers on components or structural parts
fabrication of components for turbines
fabrication of components for the oil and gas industry
fabrication of fans and flanges.

Powders with a particle size from 5 μm to 250 μm are obtained.

A too small particle size below 5 μm impairs the flow behavior and is therefore to be avoided; a too large particle size above 250 μm impairs the behavior during additive fabrication.

A too low bulk density of 2 g/cm$^3$ impairs the behavior during additive fabrication. The greatest possible bulk density of approximately 8 g/cm$^3$ is imposed by the density of the alloy.

The oxygen content must be smaller than or equal to 0.100%, in order to ensure the manufacturability and usability of the alloy. A too low oxygen content increases the costs. The oxygen content is therefore ≥0.0001%.

The powders manufactured according to this method may be used in the additive fabrication for construction of components that have the properties of the underlying alloys.

By way of example, the method according to the invention is explained as follows:

By way of example, chemical compositions (Var 1 to Var 3) of the powder variants that are possible with the method according to the invention are indicated in Table 2:

TABLE 2

| Mass % | Var 1 | Var 2 | Var 3 | Batch #185855 |
|---|---|---|---|---|
| C | 0.350 | 0.500 | 0.500 | 0.055 |
| S | 0.002 | 0.002 | 0.002 | 0.002 |
| N | <0.01 | <0.01 | <0.01 | <0.01 |
| Cr | 21.5 | 21.5 | 21.5 | 21.80 |
| Ni | Bal | Bal | Bal | 55.82 |
| Mn | 0-1 | 0-1 | 0-1 | 0.15 |
| Si | 0-1 | 0-1 | 0-1 | 0.12 |
| Mo | 9.0 | 9.0 | 9.0 | 8.86 |
| Ti | 0.30 | 0.30 | 0.30 | 0.33 |
| Nb | 0.3 | 0.3 | 0.3 | 0.01 |
| Cu | 0.01 | 0.01 | 0.01 | 0.01 |
| Fe | 1.5 | 1.5 | 1.5 | 0.32 |
| P | 0.002 | 0.002 | 0.002 | 0.002 |
| Al | 1.35 | 1.35 | 1.35 | 1.32 |
| Mg | 0.002 | 0.002 | 0.002 | 0.002 |
| Ca | 0.001 | 0.001 | 0.001 | 0.001 |
| Co | 11.15 | 11.15 | 11.15 | 11.16 |
| B | 0.020 | 0.020 | 0.025 | 0.002 |
| C/B | 17.5 | 25 | 20 | 27.5 |
| C + B | 0.37 | 0.52 | 0.525 | 0.057 |

Creep values to break are documented in Table 3. They were measured on FM 617B weld metal of batch #185855, which has a C/B ratio of (0.055/0.002)=27.5 and the sum of C+B equal to 0.057. By virtue of the C/B ratio of >25 and of the small sum of C+B, a "weldability" qualifying as adequate can indeed be achieved with the common arc method, but the creep values (time t to break) are limited and attain the required creep values of >10,000 hours in the temperature range between 650° C. and 800° C. only at static loads of sigma <83 MPa.

TABLE 3

| Sample no. | Blank no. | T [° C.] | Sigma [MPa] | Time t to break [h] |
|---|---|---|---|---|
| 21.1C | C1 | 650 | 458 | 634 |
| 21.1D | D1 | 650 | 398 | 3357 |
| 21.1E | E1 | 650 | 368 | 7712 |
| 21.1F | F1 | 650 | 330 | 17742 |
| 21.1C | C2 | 700 | 362 | 530 |
| 21.1D | D2 | 700 | 302 | 2465 |
| 21.1E | E2 | 700 | 261 | 6460 |
| 21.1F | F2 | 700 | 214 | 28567 |
| 21.1C | C3 | 750 | 261 | 322 |
| 21.1D | D3 | 750 | 192 | 3594 |
| 21.1E | E3 | 750 | 154 | 10921 |
| 21.1C | C4 | 800 | 161 | 409 |
| 21.1D | D4 | 800 | 107 | 4977 |
| 21.1F | F4 | 800 | 83 | 26442 |

The invention claimed is:

1. A method for the manufacture of a powder from a nickel-base alloy, wherein the contents of the nickel-base alloy (in wt %) are defined as follows:
C 0.015-0.5%
S max. 0.15%
Cr 20-25%
Ni the rest
Mn max. 1%
Si max. 1%
Mo up to 10%
Ti 0.25-0.6%
Nb up to 5.5%
Cu up to 5%
Fe up to 25%
P max. 0.03%
Al 0.8-1.5%
V max. 0.6%
Zr max. 0.12%
Co up to 15%
B 0.006-0.125%
O >0.00001-0.1%
and manufacturing-related impurities,
wherein the ratio of carbon to boron (C/B) lies between 4 and 25
in which
an alloy is smelted in a VIM furnace,
the molten melt is maintained for 5 minutes to 2 hours for homogenization,
a closed atomization system having a supplied gas is adjusted to a dew point of −10° C. to −120° C.,
the melt is blown by a nozzle in a gas stream with a gas flow rate of 2 qm$^3$/min to 150 qm$^3$/min,
the solidified powder particles are collected in a gas-tight closed container, wherein
the particles have a particle size of 5 μm to 250 μm,
the particles of the powder are spherical,
the powder has gas inclusions of 0.0 to 4% pore area (pores >1 μm) in relationship to the total area of evaluated objects,
the powder has a bulk density of 2 g/cm$^3$ up to the density of the alloy, which is approximately 8 g/cm$^3$,
the powder is packed air-tightly under the protective-gas atmosphere with argon.

2. The method according to claim 1, wherein the alloy is first generated as a master alloy ingot having defined chemical analysis by melting in the VIM furnace,
the master alloy ingot is cut into small pieces by sawing,
the pieces of the master alloy are melted in a VIM furnace.

3. The method according to claim 1, wherein an inert gas is used as the supplied gas.

4. The method according to claim 1, wherein argon is used as the supplied gas.

5. The method according to claim 1, wherein the gas stream in which atomization takes place comprises argon.

6. The method according to claim 1, wherein the gas stream in which atomization takes place comprises nitrogen.

7. The method according to claim 1, wherein the gas stream in which atomization takes place comprises a mixture of nitrogen and argon.

8. The method according to claim 1, wherein the atomization of the melt takes place at 0.5 to 80 kg/min.

* * * * *